United States Patent [19]

Brems et al.

[11] Patent Number: 5,566,272
[45] Date of Patent: Oct. 15, 1996

[54] AUTOMATIC SPEECH RECOGNITION (ASR) PROCESSING USING CONFIDENCE MEASURES

[75] Inventors: Douglas J. Brems, Atlantic Highlands; Max S. Schoeffler, Old Bridge, both of N.J.

[73] Assignee: Lucent Technologies Inc., Murray Hill, N.J.

[21] Appl. No.: 144,065

[22] Filed: Oct. 27, 1993

[51] Int. Cl.$^6$ .................................................. G10L 5/06
[52] U.S. Cl. .................................................... 395/2.4
[58] Field of Search ............................ 381/110, 41, 43; 379/59; 395/2.4

[56] References Cited

U.S. PATENT DOCUMENTS

| | | | |
|---|---|---|---|
| 4,827,500 | 5/1989 | Binkerd et al. | 379/88 |
| 4,922,519 | 5/1990 | Daudelin | 379/67 |
| 5,033,088 | 7/1991 | Shipman | 381/43 |
| 5,222,146 | 6/1993 | Bahl et al. | 381/41 |
| 5,230,023 | 7/1993 | Nalcano | 381/110 |
| 5,297,183 | 3/1994 | Bareis et al. | 379/59 |

OTHER PUBLICATIONS

K. P. Avila et al. "Recognition Index: A Statistical Approach to Vocabulary Diagnostics" Speech Technology, Oct.–Nov. 1987, vol. 4, No. 1, pp. 62–67.

*Primary Examiner*—Allen R. MacDonald
*Assistant Examiner*—Thomas J. Onka
*Attorney, Agent, or Firm*—Brian K. Dinicola

[57] ABSTRACT

The user interface in an automatic speech recognition (ASR) system is dynamically controlled, based upon the level of confidence in the results of the ASR process. In one embodiment, the system is arranged to distinguish error prone ASR interpretations from those likely to be correct, using a degree of confidence in the output of the ASR system determined as a function of the difference between the confidence in the "first choice" selected by the ASR system and the confidence in the "second choice" selected by the ASR system. In this embodiment, the user interface is arranged so that the explicit verification steps taken by the system as a result of uncertain information is different from the action taken when the confidence is high. In addition, different treatment can be provided based upon the "consequences" of misinterpretation as well as the historical performance of the system with respect to the specific user whose speech is being processed. In another embodiment, after an ASR system interprets an utterance, the confidence in the interpretation is assessed, and three different interactions with the user may then occur.

10 Claims, 5 Drawing Sheets

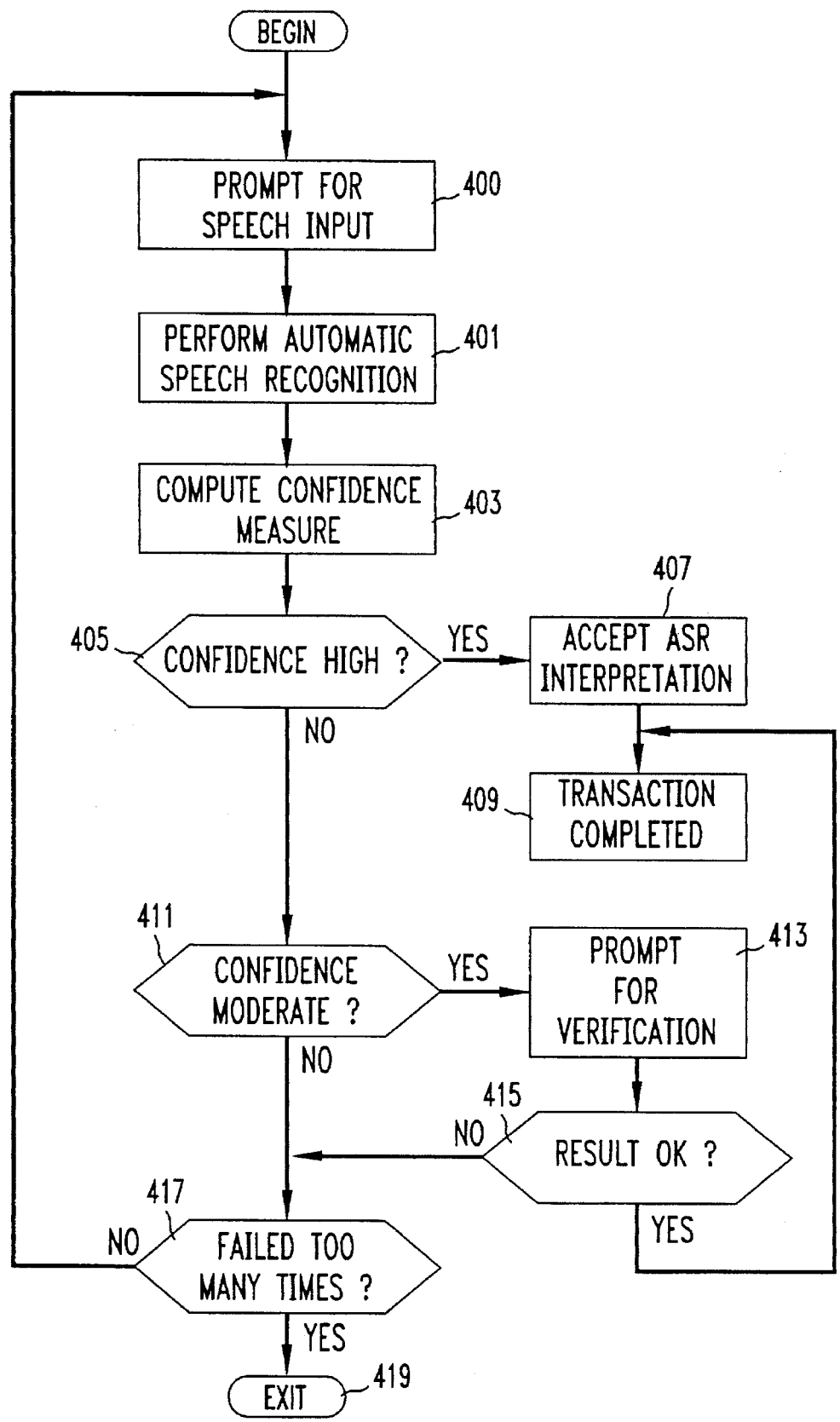

AUTOMATIC SPEECH RECOGNITION (ASR) PROCESSING USING CONFIDENCE MEASURES

FIELD OF THE INVENTION

This invention relates to Automatic Speech Recognition (ASR), and in particular, to the user interface process provided in a system using automatic speech recognition wherein a confidence measure of the ASR interpretation of an individual's speech input is computed and then used to selectively alter the treatment afforded to that individual.

BACKGROUND OF THE INVENTION

Automatic Speech Recognition (ASR) systems have begun to gain wide acceptance in a variety of applications. U.S. Pat. No. 4,827,500 issued to Binkerd et al. on May 2, 1989 describes a technique for Automatic Speech Recognition to Select Among Call Destinations in which a caller interacts with a voice response unit having an ASR capability. Such systems either request a verbal input or present the user with a menu of choices, then wait for a verbal response, interpret the response using ASR, and carry out the requested action, all without human intervention.

An important issue in designing the user interface to a system using ASR concerns the issue of handling the potential for recognition errors, since it is recognized that whenever an ASR system interprets an utterance, there is some residual uncertainty as to the correspondence between the utterance and the interpretation. This problem is especially important for input of digit strings, such as in a system in which telephone numbers or credit card numbers are spoken by the caller, because it is not uncommon to have an overall accuracy rate of only 85 to 90 percent for a digit string (and, in some cases, even for a segment of a digit string). To deal with potential errors, systems today use some type of explicit verification for all transactions where the error rate causes concern in order to avoid the possibility of processing an incorrect digit string. For example, following input of each connected digit string, the ASR system may "read back" the best digit string candidate, and require an affirmative or negative response from the individual using the system. An example would be: "Please say 'yes' if your credit card number is XXX-YYYY, and please say 'no' otherwise". While this type of explicit verification is often necessary and useful, it is cumbersome, time consuming and annoying, especially for frequent users of the ASR system, or users for whom the ASR system has a high degree of confidence. Other systems have requested a user to re-input a speech request if a previous request could not be recognized. However, when recognition does occur, a static verification process is employed.

SUMMARY OF THE INVENTION

In accordance with the present invention, the user interface in a system that uses automatic speech recognition (ASR) technology is arranged to provide a dynamic process wherein different treatment is given to a user, based upon the level of confidence in the results of the ASR process. In one embodiment, the system is arranged to distinguish error prone ASR interpretations of an utterance from those likely to be correct, using a level or degree of confidence in the output of the ASR system. The confidence can be determined as a function of the difference between the proximity scores (defined below) for the first and second choices selected by the ASR system. In this embodiment, the user interface is arranged so that the explicit verification steps taken by the system when confidence is relatively lower, is different from the action taken when the confidence is high. In addition, different treatment can be provided based upon the "consequences" of misinterpretation as well as the historical performance of the system with respect to the specific user whose speech is being processed. In another embodiment of the invention, after an ASR system interprets an utterance, the confidence in the interpretation is assessed, and three different interactions with the user may then occur.

Illustratively, where the ASR system is used to recognize numerical digits, the confidence in an interpretation can be determined by assigning a proximity score between each uttered digit and each digit model for which the ASR system has been trained, where a large score indicates good correspondence. Thus, a vector is created for each utterance that indicates the proximity of that utterance to each model. A high confidence is said to exist when the proximity score for the model with the closest proximity is much larger than the proximity score for the next best choice. This, in essence, means that the interpretation is much better than any alternative.

By mapping the confidence or "certainty level" of the results of the ASR system performance into several different action alternatives that are determined by detailed analysis of the consequence of making an error and the difficulty for the user of responding to a verification request and/or re-entering the information, the user interface to the system is considerably improved, and a user is only required to re-enter or verify a speech input when such action makes sense.

BRIEF DESCRIPTION OF THE DRAWINGS

The present invention will be more fully appreciated by consideration of the following detailed description, which should be read in light of the accompanying drawing in which:

FIG. 5 is a flow diagram illustrating the steps followed in an ASR system arranged in accordance with the present invention, in which three different outcomes result from ASR processing that yields three possible confidence levels.

DETAILED DESCRIPTION

Figure 1:
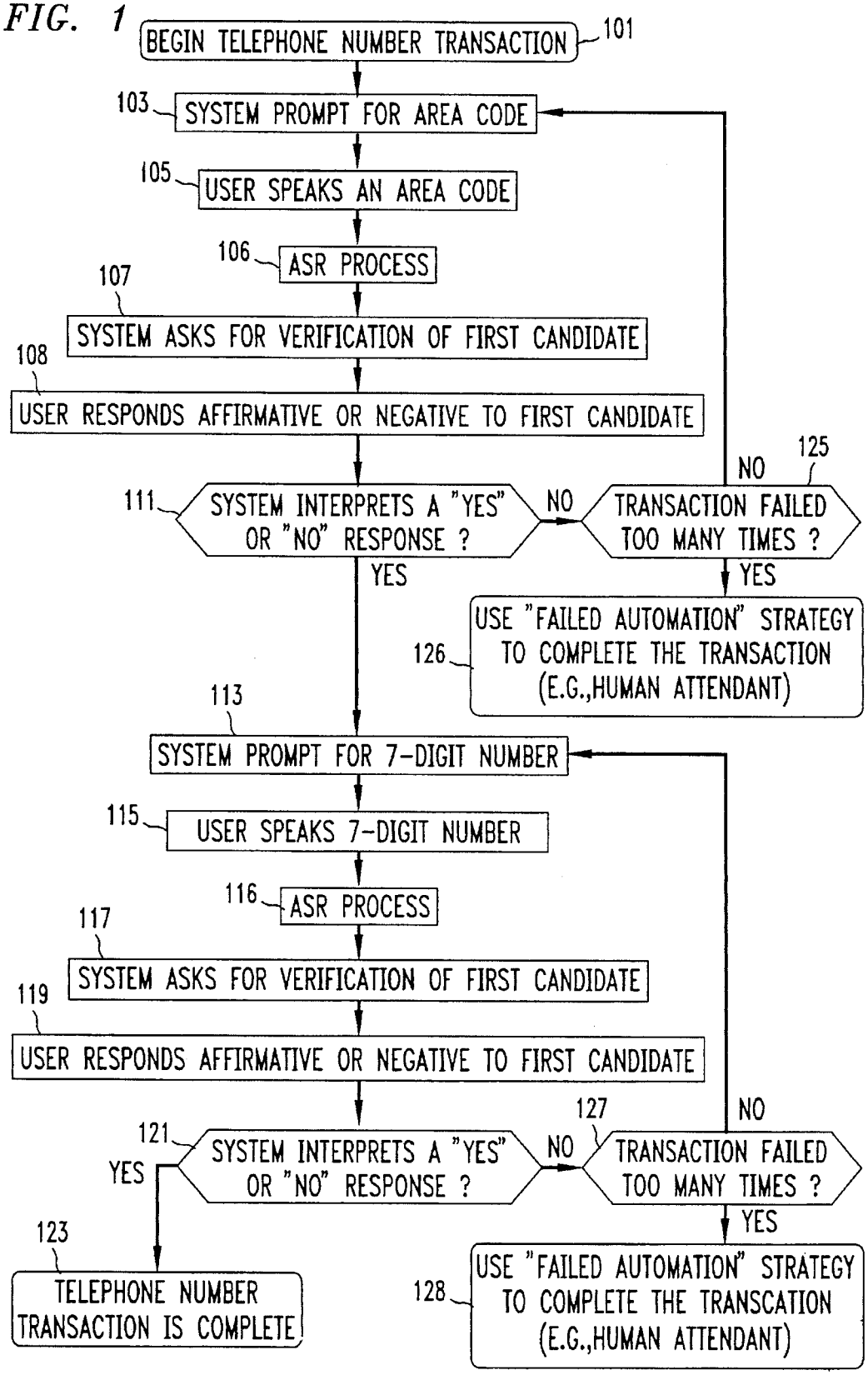
FIG. 1 is a flow diagram illustrating the steps followed in a conventional ASR system when a person dials a telephone number with voice input.

Referring first to FIG. 1, there is shown a flow diagram illustrating the steps followed in a conventional ASR system. In this example, a person dials a telephone number with voice input, and the ASR system interprets the person's utterance and takes action, such as completing a telephone call, in response to the interpretation of the utterance obtained from the ASR system. More specifically, a transaction involving the dialing of a 10 digit telephone number having a three digit area code followed by a seven digit local telephone number, is described.

The process of FIG. 1 begins in step 101, when a caller is connected to a speech processing platform, described below in connection with FIG. 4. The platform is arranged to provide audible prompts, to receive speech inputs, and to interpret the speech using ASR techniques. In step 103, the user is prompted by an audible announcement to enter the area code for the telephone call, by speaking the three digits in step 105. In step 106, any well known automatic speech recognition process is performed, and a determination is made of the digits spoken by the caller. In general, the interpretation performed by the ASR process typically involves comparison of the user inputted speech with stored speech samples. However, the ASR system can be arranged to implement any of several well known speech recognition processes.

After the three digits of the area code are recognized in step 106, the system, in step 107, requests the caller to explicitly verify that the recognized digits are, in fact, the same as the digits the user spoke in step 105. The user then responds with a "yes" or "no" answer in step 108, and the system takes different action in branching step 111, depending upon the response. In particular, if the answer received in step 108 is "yes", indicating that the first three digits were correctly recognized, the process continues with step 113, in which the user is prompted for the remaining 7 digits of the telephone number. The user speaks these seven digits in step 115, and, in step 116, a determination is made of the digits spoken by the caller, again using the ASR process as in step 106. Next, in step 117, the caller is requested to explicitly verify that the recognized digits are the same as the digits spoken in step 115. If a "yes" is spoken in step 119, the positive response is recognized in branching step 121, and the system proceeds to complete the transaction, using all ten of the recognized digits, in step 123.

If a negative response is received from the caller in step 108 or 119, that response causes branching steps 111 or 121 to transfer control to steps 125 or 127, respectively, in which a determination is made as to whether too many failed attempts have already been processed. This may be accomplished by initializing a counter when the process is begun, by incrementing the counter each time a "no" response is encountered in step 111 or 121, and by comparing the count in the counter to a predetermined threshold. If a negative response is indicated in steps 125 or 127, indicating that the threshold has not been exceeded, the process can be repeated, as by performing either steps 103–111 or 113–121 for additional recognition attempts. If a positive response is indicated in steps 125 or 127, the automatic speech recognition has "failed", and the caller may be connected to a human attendant in step 126 or 128.

The process illustrated in FIG. 1 produces the same treatment of the user, i.e, the same dialog between the user and the system, regardless of the confidence of the speech recognition accomplished in steps 106 and 116, and regardless of the historical details associated with previous verification attempts by the same user. This cumbersome, static approach is eliminated by the present invention, in favor of a dynamic approach which uses the confidence level associated with the speech recognition performed in steps 106 and 116 to alter the treatment afforded to the user.

Figure 2:
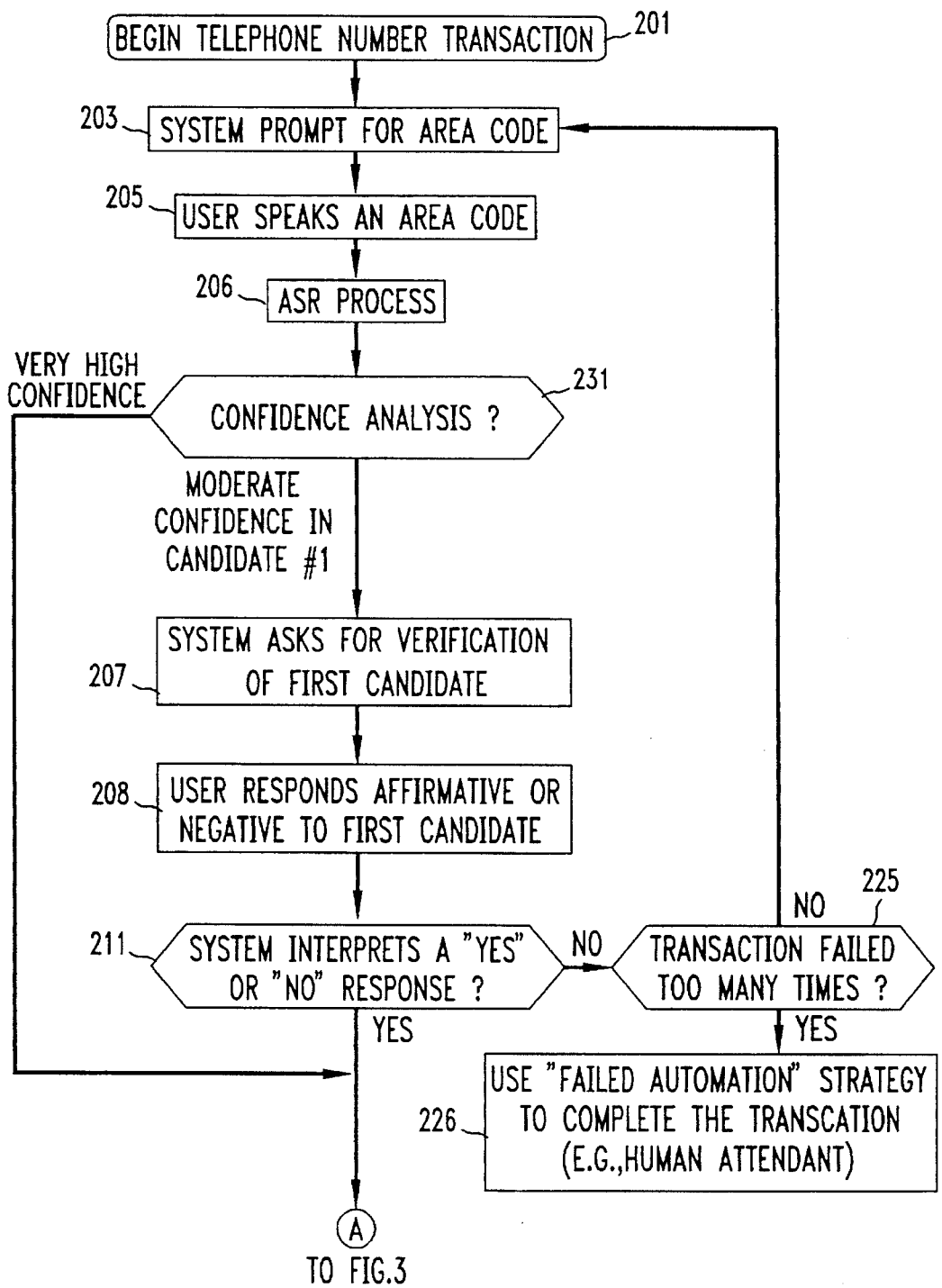
FIGS. 2 and 3 together are a flow diagram illustrating the steps followed in an ASR system arranged in accordance with the present invention, for responding to a person dialing a telephone number with voice input.
Figure 3:
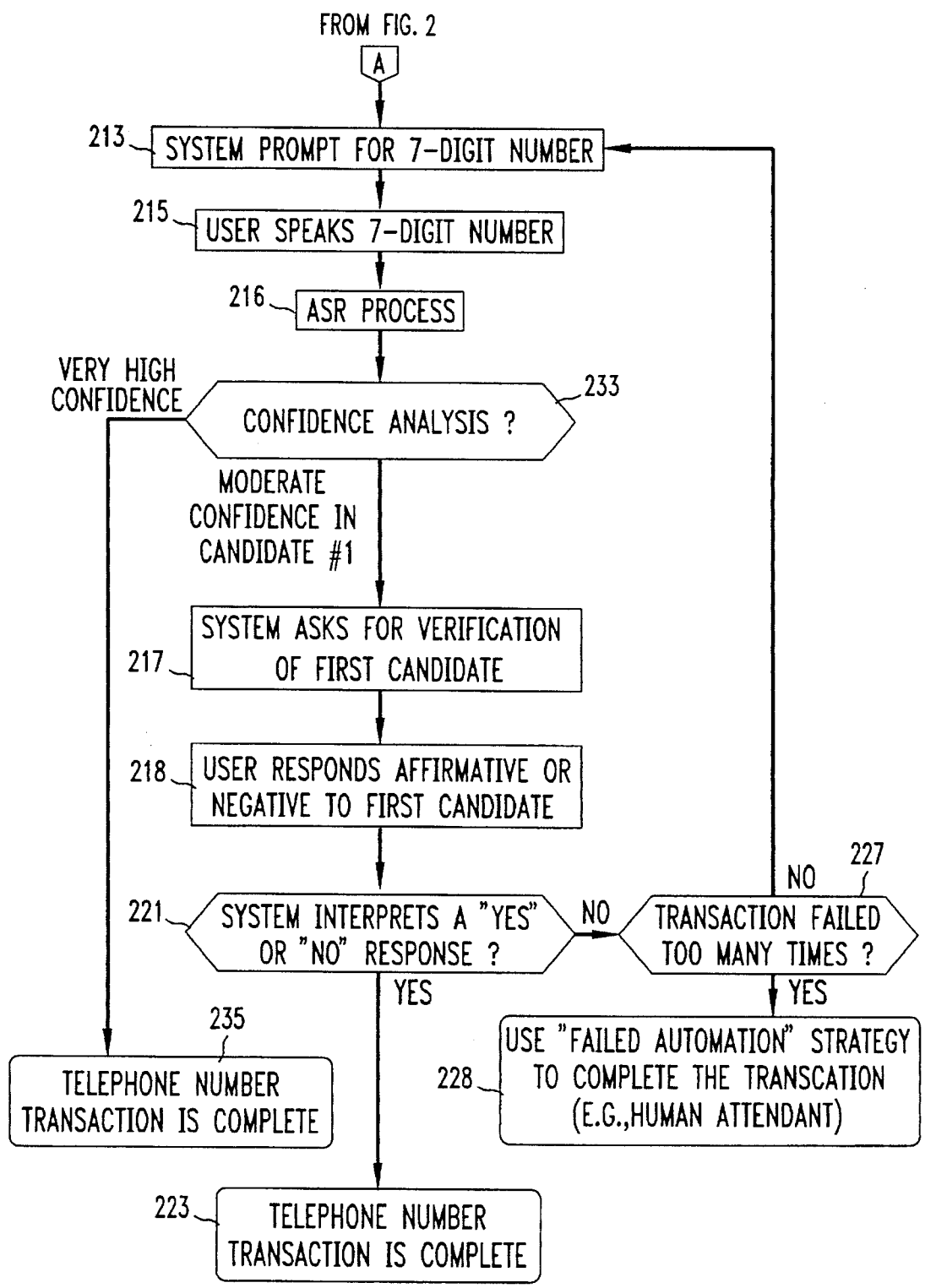

Specifically, referring now to FIGS. 2 and 3, there is shown a flow diagram illustrating the steps followed in an ASR system arranged in accordance with the present invention, for responding to a person dialing a telephone number with voice input. In this exemplary process, the same transaction as described above is performed, namely, a transaction involving the dialing of a 10 digit telephone number having a three digit area code followed by a seven digit local telephone number. The process begins in step 201, when a caller is connected to a speech processing platform arranged to perform the same functions as described above, and, in addition, to provide an indication of the confidence level associated with the recognition being performed. The details of a confidence level determination are described in more detail below. One exemplary technique for generating a confidence measure in connection with automatic speech recognition systems is described in an article entitled "Recognition Index: A Statistical Approach to Vocabulary Diagnostics" by K. P. Avila et al., Speech Technology, Oct–Nov 1987, Vol. 4, No. 1, Pages 62–67.

In step 203, the user is prompted by an audible announcement to enter the area code for the telephone call, by speaking the three digits in step 205. In step 206, an automatic speech recognition process is performed, and a determination is made of the digits spoken by the caller. As before, the interpretation performed by the ASR process typically involves Comparison of the user inputted speech with stored speech samples. However, the ASR system is also arranged to provide a confidence value, which is an indication of the confidence level associated with the recognition. As illustrated in FIG. 2, the confidence analysis performed in step 231 can have two outcomes, designated as "very high confidence" or "moderate confidence". As explained below in conjunction with FIG. 5, more than two confidence levels can be used, and the definitions of the various levels can differ.

If the confidence level determined in step 231 is "moderate confidence", the process continues in much the same was as described above. In particular, the system, in step 207, requests the caller to explicitly verify that the recognized digits are, in fact, the same as the digits the user spoke in step 205. The user then responds with a "yes" or "no" answer in step 208, and the system takes different action in branching step 211, depending upon the response. In particular, if the answer received in step 208 is "yes", indicating that the first three digits were correctly recognized, the process continues with step 213, in which the user is prompted for the remaining 7 digits of the telephone number. The user speaks these seven digits in step 215, and, in step 216, a determination is made of the digits spoken by the caller, again using the ASR process as in step 206. However, as in step 231, the ASR system is arranged to provide an indication of the confidence level associated with the recognition. As illustrated in FIG. 3, the confidence analysis performed in step 233 can have two outcomes, designated as "very high confidence" or "moderate confidence". If the outcome of step 233 represents "moderate confidence", the caller is requested in step 217 to explicitly verify that the recognized digits are the same as the digits spoken in step 215. If a "yes" is spoken in step 218, the positive response is recognized in branching step 221, and the system proceeds to complete the transaction, using all ten of the recognized digits, in step 223.

In a manner similar to that used in FIG. 1, note that if a negative response is received from the caller in step 208 or 218, that response causes branching steps 211 or 221 to transfer control to steps 225 or 227, respectively, in which a determination is made as to whether too many failed attempts have already been processed. If a negative response is indicated in steps 225 or 227, indicating that the threshold has not been exceeded, the process can be repeated, as by performing either steps 203–211 or 213–221 for additional recognition attempts. If a positive response is indicated in steps 225 or 227, the automatic speech recognition has "failed", and the caller may be connected to a human attendant in step 226 or 228.

If the confidence analysis performed in steps 231 or 233 indicates recognition with "very high confidence", a different treatment is given to the user. Specifically, if the first three digits are recognized with very high confidence, steps 207, 208 and 211 are skipped, so that the decision reached during speech recognition with respect to the first three digits is not explicitly verified. Then, if the next seven digits are also recognized with very high confidence, steps 217, 218 and 221 are skipped, so that the decision reached during speech recognition with respect to the next seven digits is not explicitly verified. Therefore, it is seen that the process illustrated in FIGS. 2 and 3 is adaptive, in that it produces a different dialog between the user and the system. The dialog is dependent upon the level of confidence of the speech recognition accomplished in steps 206 and 216.

Figure 4:
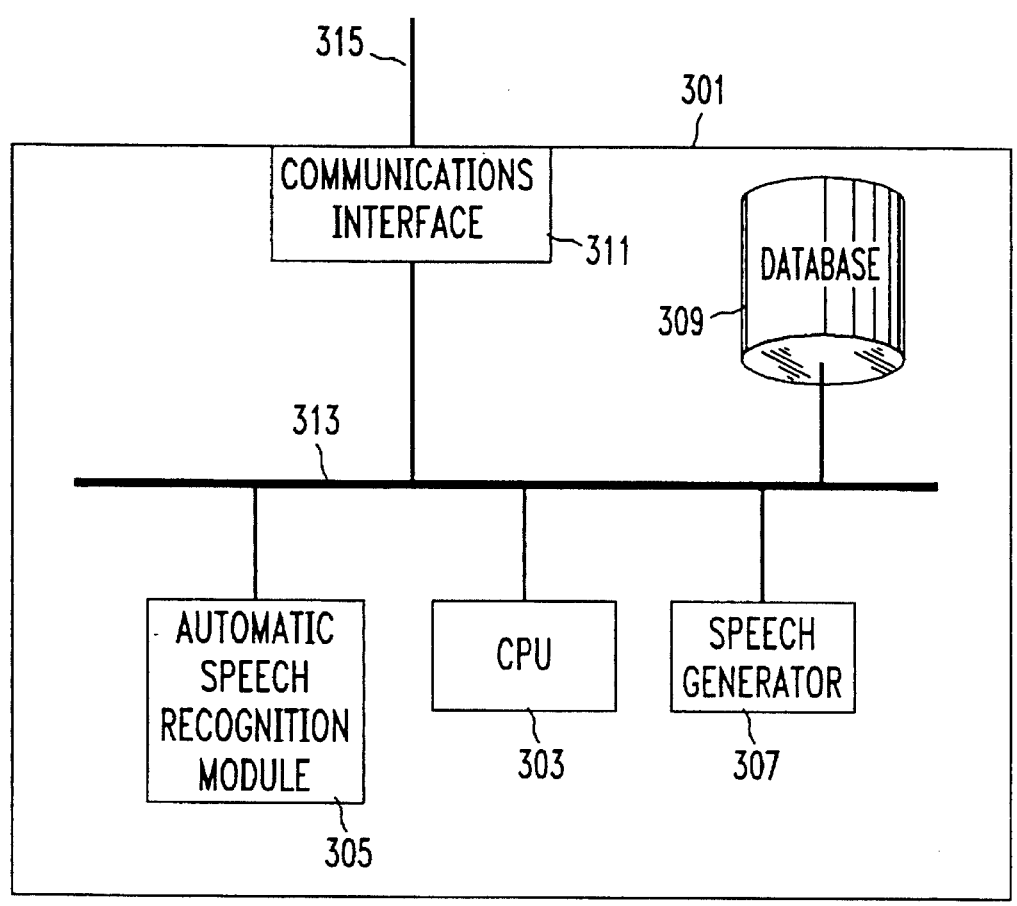
FIG. 4 is a block diagram illustrating one arrangement for a voice processing unit arranged to implement a dynamic user interface process, such as the process described in FIGS. 2 and 3.

As shown in FIG. 4, a typical speech processing unit 301 can be arranged to be used in the context of a telecommunications network, as illustrated in FIG. 1 of U.S. Pat. No. 4,922,519 issued to A. N. Daudelin on May 1, 1990, which is incorporated herein by reference. Speech processing unit 301 includes a communications interface 311 which connects it to other system components via a trunk 315. Interface 311 and trunk 315 can support multiple simultaneous two-way conversations, so that a plurality of calls can be handled at any given time. The processes performed in speech processing unit 301 are controlled by a central processing unit (CPU) 303 which, in turn, operates under the control of stored programs contained in a memory such as database 309. Functionality which is available in speech processing unit 301 includes (a) the ability, using a speech generator 307, to play announcements to a user, and (b) the ability, using ASR module 305, to interpret utterances received from a user. The sequencing of the announcements from speech generator 307 and the recognition operations performed in ASR module 305 together constitute the user interface which is dynamically controlled in accordance with the present invention. The elements of speech processing unit are interconnected with each other and with communications interface 311 via a common bus 313.

As stated above, the output from ASR module 305 includes an interpretation of the utterance received from a user, as well as an indication of the confidence in the interpretation. The latter information is made available to CPU 303, so that the user interface process may be dynamically adapted based upon the confidence level.

Speech processing unit 301 can be implemented using a Conversant MAP 100 Voice Response Unit available from AT&T, that is outfitted with a speech recognition package, and the control software stored in database 309 can be generated using an interactive tool known as a Script Builder. However, it is to be noted that the specific arrangement of speech processing unit 301 of FIG. 4 is illustrative only, and that other alternatives, such as those described in the references which are cited in the Daudelin patent, will be apparent to those skilled in the art. In particular, it is to be understood that while the processes described in connection with FIGS. 1 and FIGS. 2 and 3 relate to the use of speech recognition in the context of making telephone calls, speech recognition can also be used in a "local" process, such as when a user interacts with a computer or an appliance. A dishwasher or a personal computer can be arranged to respond to verbal commands by incorporating an automatic speech recognition unit in the apparatus. In accordance with the invention, the computer may be arranged to format a disk in response to the recognition of a verbally uttered "format" command. Since formatting is a serious operation that may result in the loss of data, the command is executed only if the command is recognized with a very high degree of confidence. If the confidence level is moderate, the user may be asked to explicitly verify the command by saying the word "yes" or by repeating the command. If the confidence level is low, the user may be required to type the command on the keyboard. In such a local arrangement, communications interface 311 would be connected to a speech input device, such as a microphone, and an output device such as a speaker or a display panel.

Referring now to FIG. 5, another embodiment of the invention is illustrated by a different user interface process. In this embodiment, a user is prompted for a speech input in step 400, and after the ASR module 305 interprets the user's utterance in step 401, the confidence in the interpretation is determined in step 403, and then assessed in terms of three possible levels, and three different interactions with the user may then occur. First, if the interpretation has a very high likelihood of being correct, a positive result is reached in step 405, and the ASR interpretation is accepted without explicit verification in step 407, despite the possibility of an occasional error. The transaction is then completed in step 409. Second, for an intermediate level of uncertainty, a positive result is reached in step 411, whereupon the user is asked to explicitly verify (or dis-verify) the result in step 413, because this may offer an advantage over forcing the user to re-enter the information (by voice or otherwise). If the result is verified, a positive result occurs in step 415, and the transaction is completed in step 409. If the result is not verified, a negative result occurs in step 415, and the user is required to repeat the process, beginning with step 400, provided that too many failed attempts have not occurred, as determined in step 417. Third, where the uncertainty is large, and/or the consequence of misinterpretation is severe, the results of both steps 405 and 411 are negative. This condition is treated as a "failure to interpret", and the user may be required to "try again" without attempting an explicit verification of the (possibly) wrong result. This is achieved by repeating the process beginning at step 400, again provided that the user has not failed too many times, as indicated in step 417. If too many failures have occurred, the process of FIG. 5 ends in step 419, whereupon the user may, in the context of a telephone call, be connected to a live attendant.

The confidence analysis performed in steps 231 and 233 of FIGS. 1 and 3, and performed in steps 405 and 411 of FIG. 5, can be accomplished by assigning a proximity score for each uttered digit to each digit model for which it has been trained, where a large score indicates good correspondence and a small score indicates poor correspondence. This approach creates a confidence value vector for each spoken digit that indicates the proximity of that utterance to each model. We have observed that it is more likely that the option with the closest proximity is the correct choice whenever the magnitude of the confidence value of the next closest proximity is much smaller. Thus, a function of the difference between these two proximity scores is used to determine the confidence level that the "best" choice interpretation of an utterance is indeed the "correct" choice. Confidence level determination can be accomplished using many alternatives, all of which use the specific data from an ASR system to distinguish utterances that are likely to be correct from those that are less likely. From this perspective, a particular error rate can be viewed as being derived from a universe that contains x% of numbers that contain < a% errors (and can be viewed as not very error prone) and y% of numbers that contain >b% and <c% errors (a more error prone set) and z% of numbers that contain >c% errors (a set deemed unlikely to be correct). Experiments with the ASR system and known speech samples can be used to determine which specific values should be used for x, y and z, and a, b and c.

It is also to be noted here that the relative "proximity" of two possible outcomes of a speech recognition task can be characterized in different ways. The ratio or linear difference in scores may be used, or some more complex function may be employed. The specific determination of "proximity" that is optimal will depend on the nature of the particular model being used and the algorithm that computes the similarity measure. Other variables may also be involved.

In accordance with the present invention, historical details, such as a success measure associated with previous verification attempts of the same user, can be used to dynamically alter or adapt the ASR process and the manner in which the ASR system interacts with the user, since all users of ASR systems do not experience the same success levels nor generate the same confidence levels. The labels "sheep" and "goats" can be used to describe this arrangement, namely that the ASR process used for some people (i.e., "sheep") for whom the process works well, is different from the process used for other people (i.e., "goats") for whom the process works poorly. Clearly, when an ASR system introduces an explicit verification step in the user interface, it improves the system performance for goats in that fewer errors are permitted to occur. At the same time, it degrades the quality of the interface for all users by introducing the extra interaction, and the sheep (whose speech is generally understood by the system), have less of a need for that step.

The use of a historical "success measure" permits accommodation of both types of users, because the "success measure" permits differentiation between users that are likely to be sheep and those who are likely to be goats. Determination or prediction of which individuals are "ASR sheep" is possible when ASR processing is used in connection with a subscriber-based service, where the same users are involved over a period of time. In such services, it is quite easy to track, for a given user, how often the ASR system returns a high confidence score and/or how often a particular user is successful, with or without explicit verification. Users who consistently receive high confidence scores and/or who consistently succeed are "presumed sheep". For these users, the verification step can be dispensed with, even if the confidence level is not "very high" on some occasions. Indeed, for persons for whom the ASR system has historically performed well, a moderate confidence level can lead the process to skip explicit verification and dispense with steps 207, 208 and 211 and/or steps 217, 218 and 221 in FIGS. 2 and 3, and to dispense with steps 413 and 415 in FIG. 4. For users who have a large success measure, those steps would thus only be performed when the results in step 231 or 233 produced a "low" confidence level, or when the results of both steps 405 and 411 was negative. Note here that in some implementations in which historical information cannot be obtained, such as when a new user operates a computer using voice commands, it is not feasible to compare historical user utterances with ASR recognition and to track how often recognition is successful.

The historical information needed to differentiate between various classes of users can be stored in database 309 of FIG. 4 and retrieved in response to an individual's access to speech processing unit 301. For example, the user can be identified by automatic number identification (ANI) information which is presented to an originating switch when a telephone call is originated from a telephone station served by that switch. Alternatively, the user can be identified by a personal identification number (PIN) that is provided by the user as pan of the ASR process. In either event, the ANI or PIN is used as a retrieval key to ascertain information from the database indicating if a particular user is one for whom the process should be changed, and, if so, how it should be changed. In essence, the system can thus determine is the user is a sheep or a goat.

The present invention was simulated in a test which collected a 10-digit telephone number in two parts, a 3-digit area code and a 7-digit local number, using Automatic Speech Recognition on an AT&T Conversant System. In this experiment, confidence measures of digit string candidates were used to improve the user interface, so that the explicit verification steps were not performed when the first digit string candidate received a much higher confidence score than the second digit string candidate. Specifically, an AT&T Conversant System was arranged to assign a confidence value between 1 and 1,000,000 to each of up to four possible digit string candidates. The candidate with the highest confidence value was called, the "first candidate"; the candidate with the second highest confidence value was called the "second candidate"; and so on. The system calculated the difference in confidence values between the first and second candidates in order to determine a confidence level in the ASR result, and then used this difference to adjust the overall process in terms of which explicit verification prompts were or were not played, and which steps in the process were skipped. If the difference between candidate #1 and candidate #2 was greater than 6000, it was assumed that the confidence was high enough to alter the process and skip the explicit verification steps. In those transactions where confidence score difference was less than 6000, a dialog of the following type occurred, where S: represents the system prompt, and U: represents the user input:

S: Please say just the area code that you would like to call, now.

U: Nine, Zero, Eight.

S: Did you say Nine, Zero, Eight?

U: Yes.

S: Please say the 7-digit telephone number that you would like to call, now.

U: Nine, Four, Nine, Six, Five, One, Zero.

S: Did you say Nine, Four, Nine, Six, Five, One, Zero?

U: Yes.

S: Thank you . . .

On the other hand, if the confidence score difference was greater than 6000, a dialog of the following type occurred:

S: Please say just the area code that you would like to call, now.

U: Nine, Zero, Eight.

S: Please say the 7-digit telephone number that you would like to call, now.

U: Nine, Four, Nine, Six, Five, One, Zero.

S: Thank you . . .

ASR performance and preference data that were collected showed that the user interface that dynamically used confidence scores to adapt the verification process was better than the conventional user interface. The average time to complete telephone number transactions was decreased by about 25 percent; users preferred the system that used confidence scores; and the percentage of "wrong number" calls was not increased. Similar findings were observed for other process adjustments based on confidence scores.

With respect to use of historical data as a success measure in determining the user interface in processing of ASR samples, subjects were divided into two groups. One group, the presumed sheep, was defined as those users for whom the recognizer had high confidence in at least 60% of the transactions (where users made up to 32 ASR attempts). The other group, the presumed goats, constituted the remainder. For each user group, the overall ASR accuracy was compared with accuracy for those transactions where the recognizer showed "high confidence" (defined as a confidence difference score > 6000). It was found that the overall ASR performance showed a success rate of 83.8 percent However, if only those transactions where ASR confidence was high were considered, a 97.5 percent success was found, indicating that on these occurrences there is less of a need to have the user confirm the result as was noted earlier. However, recognizer accuracy can also be considered for just the ASR presumed sheep during "high confidence transactions." The data show that for these users, the ASR system achieves an extremely high performance, with 406 successes in 407 attempts for an accuracy rate of 99.8 percent.

In short, these experiments showed that there are some users for whom the recognizer shows high confidence frequently. For such individuals, when confidence is high, the recognizer is virtually always correct. In those situations where these presumed sheep can be identified, an optimal ASR user interface can be defined—one that permits completion of transactions that are as fast or faster than speaking with a live attendant. This may require making real-time call flow decisions based on recognizer confidence scores and/or on a subscriber's stated ASR preferences or system usage history. The general point, however, is that the user interface should recognize the different needs of the goats and sheep. While most current systems are optimized only for goats, it is possible to optimize the call flows for both sheep and goats.

Various changes may be made in the present invention by those of ordinary skill in the art. Accordingly, the invention should be limited only by the appended claims.

We claim:

1. A system for adapting the user interface in systems that: accept speech input and perform automatic speech recognition (ASR), comprising means for receiving .an utterance;

means for processing said utterance using ASR to generate an interpretation of said utterance and to determine a level of confidence in said interpretation; and means for selectively adapting the verification of said interpretation requested from the user as a function of said confidence level, wherein said system further includes means for storing, for each user of said system, information representing a success measure computed as a function of previous uses of said system, and means for retrieving information from said storing means and for adapting said user interface as a function of the value of said success measure.

2. The invention defined in claim 1 wherein said success measure includes the previous success rate for said each user of said system.

3. The invention defined in claim 1 wherein said success measure includes previous confidence values associated with ASR interpretations for said each user.

4. The invention defined in claim 1 wherein said system is arranged to compare said success measure to a user dependent threshold.

5. An automatic speech recognition system comprising means for generating an interpretation of a user's utterance and a confidence value for said interpretation, and user interface means operative in response to the magnitude of said confidence value, for (a) requesting said user to verify said interpretation prior to accepting said interpretation as an accurate representation of said utterance, or (b) accepting said interpretation as an accurate representation of said utterance without verification.

wherein said system further includes means for storing information indicative of the previous success of said system in interpreting utterances of said user, and means for responsive to said stored information for controlling said user interface means.

6. A method of adapting the user interface in systems that accept speech input and perform automatic speech recognition (ASR), comprising the steps of receiving an utterance;

processing said utterance using ASR to generate an interpretation of said utterance and to determine a level of confidence in said interpretation; and selectively adapting the verification of said interpretation requested from the user as a function of said confidence level, storing, for each user of said system, information representing a success measure computed as a function of previous uses of said system, and retrieving information and altering the user interface as a function of the value of said success measure.

7. The method defined in claim 6 wherein said success measure includes the previous success rate for said each user of said method.

8. The method defined in claim 6 wherein said success measure includes previous confidence values associated with ASR interpretations for said each user.

9. The method defined in claim 6 wherein said method further includes comparing said success measure to a user dependent threshold.

10. A method for performing automatic speech recognition system comprising the steps of generating an interpretation of a user's utterance and a confidence value for said interpretation, and adapting the operation or a user interface in response to the magnitude of said confidence value, by (a) requesting said user to verify said interpretation prior to accepting said interpretation as an accurate representation of said utterance, (b) accepting said interpretation as an accurate representation of said utterance without verification, or (c) rejecting said interpretation and requesting said user to provide a new utterance, wherein said method further includes the steps of storing information indicative of the previous success of said system in interpreting utterances of said user, and adapting said user interface in response to said stored information.

* * * * *